United States Patent [19]

Mori

[11] Patent Number: 4,943,141

[45] Date of Patent: Jul. 24, 1990

[54] SOLAR RAY COLLECTING DEVICE

[76] Inventor: Kei Mori, 3-16-3-501, Kaminoge, Setagaya-ku, Tokyo, Japan

[21] Appl. No.: 325,701

[22] Filed: Mar. 20, 1989

[30] Foreign Application Priority Data

May 17, 1988 [JP] Japan .................................. 63-120389

[51] Int. Cl.$^5$ ............................. G02B 7/2; F24J 2/08; F21S 11/00
[52] U.S. Cl. .................................... 350/258; 350/321; 350/252; 126/440
[58] Field of Search ........................ 350/258, 252, 321; 126/440

[56] References Cited

U.S. PATENT DOCUMENTS

| | | | |
|---|---|---|---|
| 4,409,963 | 10/1983 | Mori | 126/440 |
| 4,477,145 | 10/1984 | Mori | 350/96.10 |
| 4,509,500 | 4/1985 | Mori | 126/440 X |
| 4,565,185 | 1/1986 | Mori | 126/440 X |
| 4,761,716 | 8/1988 | Mori | 350/258 |
| 4,809,675 | 3/1989 | Mori | 126/440 |

Primary Examiner—Bruce Y. Arnold
Assistant Examiner—David R. Parsons
Attorney, Agent, or Firm—Jordan and Hamburg

[57] ABSTRACT

A solar ray collecting device comprises a solar ray collecting portion including a number of solar ray collecting elements, a transparent dome for covering the solar ray collecting portion, a base plate for supporting the dome, a first-revolution shaft for rotating the base plate, a support arm for supporting the first-revolution shaft and a second-revolution shaft for rotating the support arm around an axis being perpendicular to that of the first revolution shaft. The first revolution shaft and the second revolution shaft are controlled in such a way as to direct the light receiving surface of the lens system toward the sun to introduce solar rays into the optic fiber cable. Each solar ray collecting element is provided with a correct mounting means for setting the light-receiving surface of the element at a right angle to the light that has passed through the dome.

2 Claims, 3 Drawing Sheets

SOLAR RAY COLLECTING DEVICE

BACKGROUND OF THE INVENTION

The present invention relates to a solar ray collecting device wherein solar rays passing through a transparent dome are collected by a plurality of solar ray collecting elements.

The present applicant has previously proposed a sun ray collecting device in which the sun's rays are focused by a lens, guided into an optical conductor, and then transmitted through the optical conductor onto an optional desired place for use in illumination or for other like purposes. Furthermore, the present applicant has also proposed that the afore-mentioned sun ray collecting device be accommodated in a transparent capsule in order to protect the lens from wind, rain, dust etc.

The sun ray collecting device previously proposed by the present applicant has a cylindrical foundation, a dome-shaped head portion made of a transparent material, and a capsule for use in the sun ray collecting device consisting of a foundation and a head portion. When the device is being employed, the sun ray collecting device is accommodated inside the capsule. The sun ray collecting device comprises, for instance, a large number of lenses, a large number of lens-holding apparatuses provided for the respective lenses, and a large number of optical fibers or an optical conductor cable having a light-receiving end placed at the focal position of the lens.

The sun's rays focused by the lenses are guided into the optical conductor cable and transmitted through it onto an optional desired place.

In the above-mentioned prior art, since the dome-shaped head is fixed to the cylindrical body, the head must be made to cover the whole area where the solar ray collecting portion follows the sun's movement, and therefore the head must be of a spherical shape of an increased size.

Such a large dome-shaped head is difficult to manufacture and is very expensive. Furthermore, it is impossible to make a head having a precise spherical shape and a uniform thickness. It has also been found that the dome having a partly uneven wall thickness may refract solar rays in various directions in relation to the solar ray collecting portion with the result that there is reduced efficiency in collecting solar rays.

SUMMARY OF THE INVENTION

It is an object of the present invention to provide a solar ray collecting device which can cope with variations in solar ray refraction due to the unavoidable partial unevenness of the dome's thickness in order to make it easier to manufacture the dome and furthermore so as to effectively collect all of the solar rays passing though any part of the dome which at its center may allow the light to pass along normally and to refract the light outwardly at its circumference.

DESCRIPTION OF THE PREFERRED EMBODIMENTS

Figure 1:
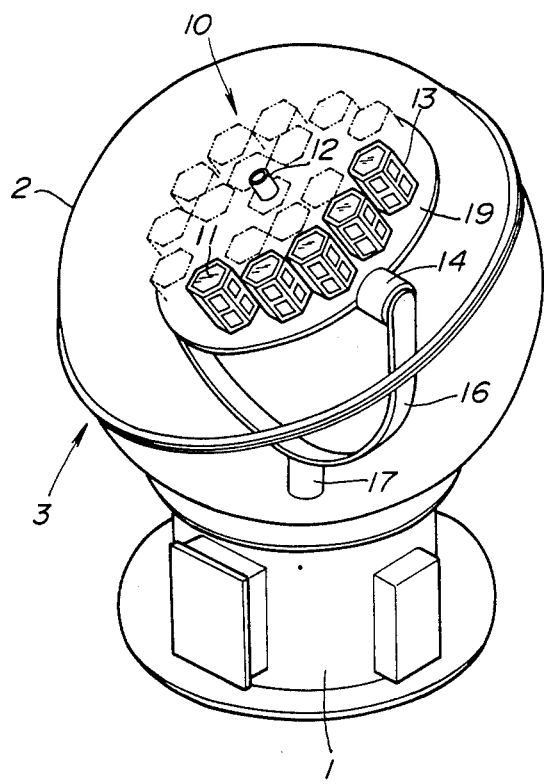
FIG. 1 is a view for explaining an example of a solar ray collecting device previously proposed by the present applicant.

FIG. 1 is a view for explaining an embodiment of the solar ray collecting device previously proposed by the present applicant. In FIG. 1, a capsule 3 for use in the solar ray collecting device is constructed of a cylindrical body 1 and a transparent dome-shaped head 2. As shown in FIG. 1, the solar ray collecting portion 10 is accommodated in said capsule when the device is being used. The solar ray collecting portion 10 comprises a plurality of lenses 11, a solar position sensor 12 for detecting the sun's location, a support frame body 13 for unitarily holding the lens 11 and a sensor 12, a first-revolution shaft 14 for rotating the support frame 13, a support arm 16 for rotating the first revolution shaft 14, and a second-revolution shaft 17 for rotating the support arm around an axis that is perpendicular to that of the first revolution shaft 14. The sun's direction is detected by means of the solar position sensor 12 and its detection signal controls the first and the second revolution shafts so as to always direct the lenses 11 toward the sun, and the sunlight focused by the lenses 11 is guided into a fiber optic cable, not shown in FIG. 1, through its light-receiving end located at the lens' focal plane. The guided sunlight is transmitted through the fiber optic cable to wherever the light is needed.

In the above-mentioned prior art, since the dome-shaped head is fixed to the cylindrical body, the head must be made to cover the whole area where the solar ray collecting portion follows the sun's movement, and therefore the head must be of a spherical shape of an increased size.

Such a large dome-shaped head is difficult to manufacture and is very expensive. Furthermore, it is impossible to make a head having a precise spherical shape and a uniform thickness. It has also been found that the dome having a partly uneven wall thickness may refract solar rays in various directions in relation to the solar ray collecting portion with the result that there is reduced efficiency in collecting solar rays.

The present invention was made to provide a solar ray collecting device which is free from the above-mentioned drawbacks of the prior art and which can cope with variations in solar ray refraction due to the unavoidable partial unevenness of the dome's thickness in order to make it easier to manufacture the dome and furthermore so as to effectively collect all of the solar rays passing through any part of the dome which at its center may allow the light to pass along normally and to refract the light outwardly at its circumference.

In the present invention, a solar ray collecting portion is constructed of a plurality of solar collecting elements, each element comprising a solar ray focusing lens, an optic fiber with its tip placed at the lens' focal point and a correct mounting base for integrally holding thereon said lens and said optic fiber. A transparent dome for covering these solar ray collecting elements is secured at the base plate. The dome may be no more than a half-sphere. It is also possible to form the dome in the shape of a nearly flat roundish cover. The base plate is secured onto a first-revolution shaft for rotating said base plate with the dome and the first revolution shaft is rotatingly supported on both sides by a support arm which is provided with a second-revolution shaft for rotating said support arm around an axis that is perpendicular to that of the first-revolution shaft. The second-revolution shaft is rotatingly mounted on a supporting body. As distinct from the prior art wherein all solar ray collecting elements are fixed so as to have their axes parallel to each other, the present invention makes it possible to individually align and mount each solar collecting element on the base plate through the use of a correct mounting means capable of aligning the element's axis to the entering solar rays in accordance with the dome shape when the solar ray collecting device is being directed toward the sun. Application of the correct mounting means makes it possible to bring a lens' axis exactly into coincidence with the incident solar rays' direction and furthermore to additionally compensate the lens position with regard to the solar ray refraction due to the unevenness of the dome wall's thickness.

These objects and features of the present invention are achieved in the following description of a preferred embodiment.

Figure 2:
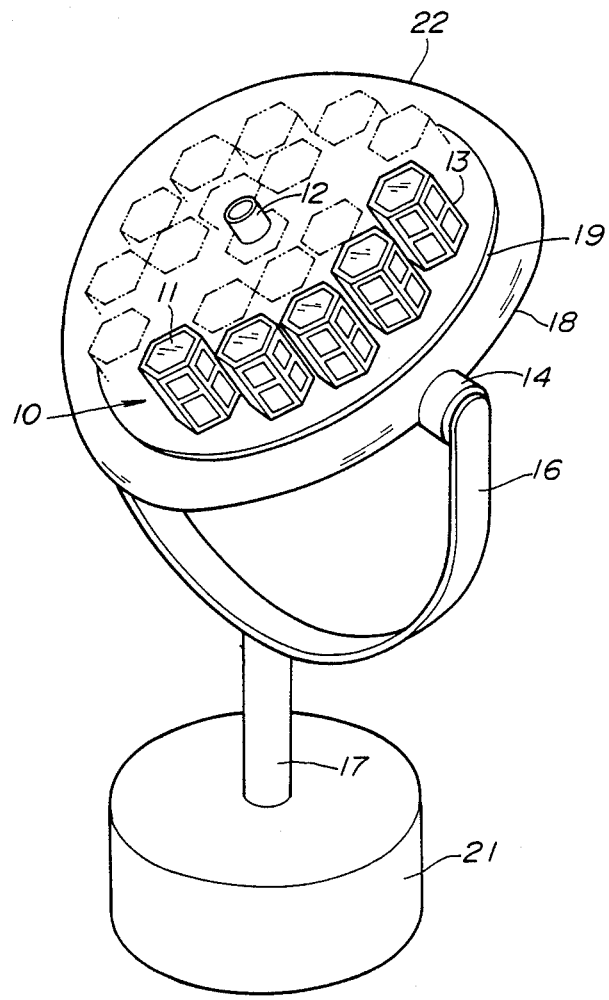
FIG. 2 is a perspective view for explaining a solar ray collecting device embodying the present invention.
Figure 3:
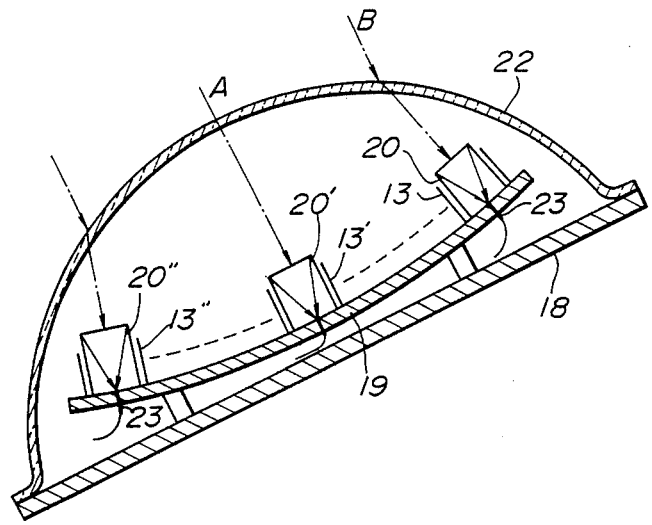
FIG. 3 is a schematic sectional view showing a part of said solar ray collecting device.

FIG. 2 is a perspective view of an embodiment of the invention and FIG. 3 is a partly sectional view of the same. In these figures, 21 is a cylindrical base body and 22 is a transparent dome. The dome 22 is secured to a base plate 18. Each support frame 13 integrally holds a lens 11 and has at its lower center the tip of an optic fiber 23 fixed thereto. 12 is a sensor for detecting the sun's location. In the below-mentioned account, the support frames 13 of the solar ray collecting elements 20, 20' and 20" are mounted on a curved mounting plate 19 with its concave surface at the light-receiving side. The mounting plate 19 can be supported by a corresponding means on the base plate 18. The base plate 18 is supported by a first-revolution shaft 14, said revolution shaft 14 being rotatingly supported by a support arm 16, said arm 16 being rotatingly supported by a second-revolution shaft 17 which is portatively mounted on a lower base body 21 and rotates the support arm 16 around an axis that is perpendicular to that of the first-revolution shaft. The direction of the sun is detected by means of the solar position sensor 12 and its detection signal controls the first and second revolution shafts so as to always direct the lenses 11 toward the sun.

Figure 4:
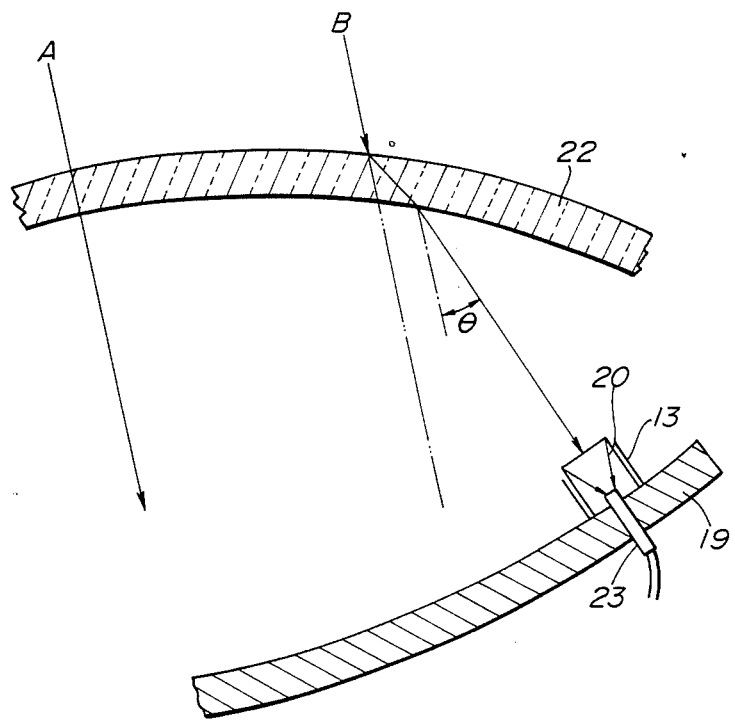
FIG. 4 is a view for explaining the operating principle of the present invention.

The reason why the curved mounting plate 19 is used in the present invention is as follows:

In FIG. 4, "A" shows a solar ray passing straight through the center of the dome 22 and along the normal contours of the dome body and "B" shows a solar ray which passes through an exaggerated circumferential part of the dome while refracting outwardly by an angle of "$\theta$" in relation to the incident direction since its incident angle differs from the normal direction of the dome.

In the present invention, the solar ray receiving lens can be aligned so that its axis may be exactly coincident with the refracted solar rays. Namely, the solar ray elements are correctly mounted on the base plate in such a way that more peripheral elements are arranged inward since its surface is inclined. For the above-mentioned purpose it is possible to use, for example, a mounting plate with a concave surface upside down as shown in FIGS. 2 and 3. Obviously many variations of the correct mounting means are possible in constructing such as, for example, a plate having a step-wise inclined surface, an individually swinging cross-arm plate for holding each element etc. Furthermore, in case of using the correct mounting plate it may also be possible to provide a means for adjustably fixing a support frame 13 to said correct mounting plate so as to align each solar ray collecting element more exactly.

As is apparent from the foregoing description, by using a solar ray collecting device according to the present invention, since the device can align itself exactly, each solar ray collecting element in relation to the solar rays that have passed through the dome covering and which also follow the dome together with its base plate in the direction of the sunlight, keeping always a constant relative position between the dome and each solar ray collecting element, it may be possible to more effectively collect sunlight.

I claim:

1. A solar ray collecting device comprising a solar ray collecting means comprising a plurality of solar ray collecting elements, each of said elements consisting of a lens for focusing solar rays and an optic fiber cable having a light-receiving end located at the focal point of said lens, a transparent dome for covering said solar ray collecting means, a base plate for supporting said dome, a first-revolution shaft for rotating said base plate, a support arm for supporting said first-revolution shaft and a second-revolution shaft for rotating said support arm around an axis which is perpendicular to the axis of the first-revolution shaft, wherein the first-revolution shaft and the second-revolution shaft are controlled in such a way as to direct the light-receiving surface of said lens toward the sun to introduce solar rays into the optic fiber cable in order to transmit said solar rays therethrough to any place where the light is needed, characterized in that each of said solar ray collecting elements is provided with a correct mounting means for setting said light-receiving surface of said lens at a right angle to the light that has passed through said dome.

2. A solar ray collecting device, according to claim 1, characterized in that the correct mounting means comprises a setting plate having a concave surface at its light-receiving side.

* * * * *